US007173678B2

(12) United States Patent
Havelka et al.

(10) Patent No.: US 7,173,678 B2
(45) Date of Patent: Feb. 6, 2007

(54) NON-RUGGEDIZED COTS DISPLAY PACKAGING FOR SEVERE ENVIRONMENT APPLICATIONS

(75) Inventors: Steven E. Havelka, Los Angeles, CA (US); Albert V. Scappaticci, Calabasas, CA (US); Thomas Loo, Calabasas, CA (US); Ban S. Bong, Calabasas, CA (US); Ragini Saxena, Simi Valley, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 48 days.

(21) Appl. No.: 10/877,334

(22) Filed: Jun. 25, 2004

(65) Prior Publication Data

US 2005/0285990 A1 Dec. 29, 2005

(51) Int. Cl.
*G02F 1/1333* (2006.01)

(52) U.S. Cl. .......................................... 349/58; 349/60

(58) Field of Classification Search .................. 349/58, 349/60

See application file for complete search history.

(56) References Cited

U.S. PATENT DOCUMENTS 3,910,029 A * 10/1975 Yamazaki .................... 368/84
4,183,629 A * 1/1980 Nishimura et al. ......... 349/160
4,420,748 A * 12/1983 Jurgen ........................ 345/618
5,182,660 A * 1/1993 Tanaka ........................ 349/65
5,583,681 A * 12/1996 Shioya et al. ................. 349/60
5,606,438 A * 2/1997 Margalit et al. .............. 349/60
5,659,376 A * 8/1997 Uehara et al. ................ 349/58
5,710,607 A * 1/1998 Iwamoto et al. .............. 349/60
5,748,269 A * 5/1998 Harris et al. .................. 349/58
5,933,206 A * 8/1999 Niibori et al. ................ 349/60
6,049,037 A 4/2000 Schlatmann ........... 174/35 MS
6,380,999 B1 * 4/2002 Tannas, Jr. .................. 349/153
2001/0026625 A1 * 10/2001 Azima et al. ............... 381/152
2002/0149714 A1 * 10/2002 Anderson et al. ............. 349/59
2003/0013048 A1 1/2003 Gilson
2004/0141101 A1 * 7/2004 Osu et al. ...................... 349/58
2006/0164567 A1 * 7/2006 Fukayama et al. ............ 349/58

FOREIGN PATENT DOCUMENTS

EP 0730185 9/1996
EP 0844509 5/1998
EP 0910107 4/1999
JP 2001249332 9/2001
JP 2003195773 7/2003

OTHER PUBLICATIONS

International Search report for corresponding international application PCT/US2005/017563, Mailed Apr. 3, 2006.

Partial International Search report for corresponding international application PCT/US2005/017563, Mailed Jan. 13, 2006.

* cited by examiner

*Primary Examiner*—James A. Dudek

(57) ABSTRACT

A modular display assembly comprising a light emitting or transmitting display panel and a glass panel wherein: the display and glass panel are separated from each other by a frame assembly; and the display is coupled to the frame assembly by at least one elastic isolator.

9 Claims, 1 Drawing Sheet

NON-RUGGEDIZED COTS DISPLAY PACKAGING FOR SEVERE ENVIRONMENT APPLICATIONS

FIELD OF THE INVENTION

The present invention relates generally to flat (Commercial-Off-The-Shelf) COTS display technologies adapted and housed in assemblies for military and other severe environments, apparatus incorporating such assemblies, and methods for forming and using such assemblies.

BACKGROUND OF THE INVENTION

Used in the context of flat displays, the term "ruggedized" typically means multiple layers of front glass, diffusers, polarizers, heater glass, and other layers bonded together with the flat display. Multiple layers of epoxy, adhesive, optical compounds, and other bonding materials are used to attach the layers. "Ruggedized" flat displays are undesirably thick, heavy, and costly. In addition, significant process control and producibility problems lead to low yield and long-lead production schedules. In addition, "ruggedized" flat displays often do not satisfactorily meet user requirements due to design problems inherent to the complex stacked, bonded, and layered approach. As such, new packaging techniques and apparatus that provide means for producing lighter, thinner, simpler, less costly, and more reliable display assemblies are very desirable. This disclosure is directed to such new packaging techniques, apparatus and design methods.

SUMMARY OF THE INVENTION

A modular display assembly comprising a light emitting or transmitting display and a glass panel wherein the display and glass panel are separated from or held in contact with each other by a frame assembly, and the display is coupled to the frame assembly by at least one elastic isolator.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

In a preferred embodiment, a modular display assembly comprises any thin light emitting or transmitting display wherein the display and glass panel are either slightly separated from each other or in contact, are held together with a frame assembly and a rear plate/chassis, and the display is coupled to the rear plate/chassis by at least one elastic isolator.

Figure 2:
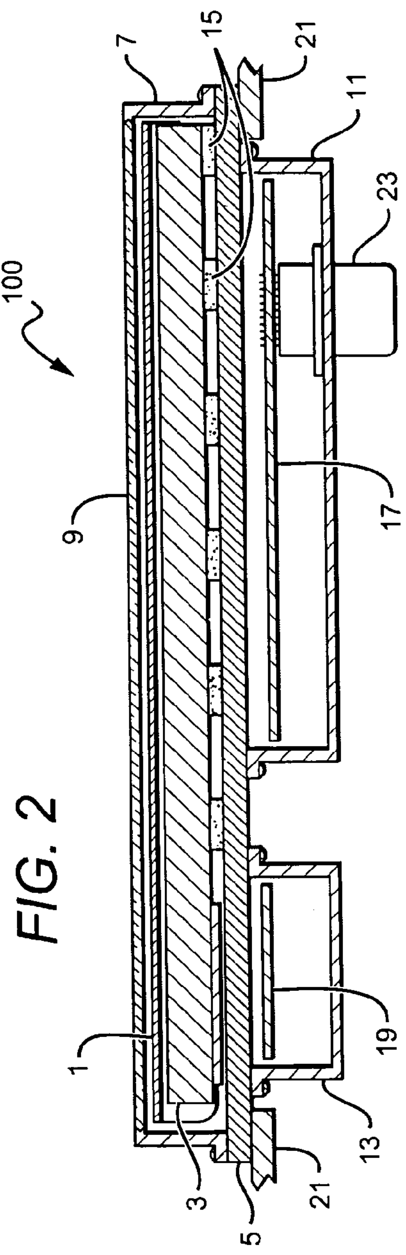
FIG. 2 is a cutaway side view of the display assembly of FIG. 1.
Figure 1:
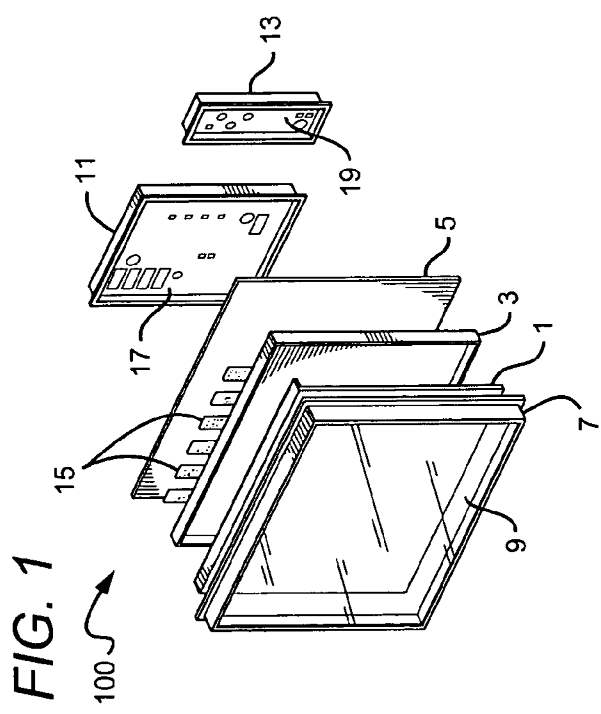
FIG. 1 is an exploded view of a display assembly in accordance with the present invention.

Referring to FIGS. 1 and 2, a display assembly 100 comprises a display panel 1, a diffuser and backlight assembly 3 (which is only needed a if light transmitting display technology is being used), a plate/chassis 5, a frame/bezel 7, a plurality of elastic isolators 15, a glass panel/cover 9, circuit board covers 11 and 13, circuit boards 17 and 19, and external interface connector 23. Bulkhead 21 is the display user's mounting surface, typically an aircraft, ship, boat, or ground vehicle or other installation's operator panel usually located in front of a computer operator, pilot, copilot, or ship, boat, or vehicle operator.

Display panel 1 may comprise any type of light emitting or transmitting display. It is contemplated that the display apparatus described herein may be formed using commercial off the shelf display panels of varying technologies including liquid crystal displays (LCD's), light emitting diode displays (LED's), organic light emitting diodes (OLED's), and other flat display technologies available now or anytime in the future. It is also contemplated that the methods and apparatus described herein are particularly well suited for use with flat form and/or panel display technologies.

If a chosen display technology requires lighting such as by diffuser and backlight assembly 3, such lighting may comprise any type of lighting suitable for use with the chosen display technology. When using light transmitting display technologies (such as LCD's), the diffuser and backlight assembly 3 preferably comprise commercial off the shelf backlights, bulbs, LED's, and/or other light sources, and commercial off the shelf diffuser sheet materials.

When using light transmitting display technologies (such as LCD's), display panel 1 is preferably loosely coupled to diffuser and backlight assembly 3 by a sub-frame (not shown) such that the display panel is positioned adjacent to diffuser and backlight assembly 3. The sub-frame coupling display panel 1 is the only support provided to display panel 1 other than support it obtains from assembly 3 or plate/chassis 5 due to being positioned adjacent to assembly 3 or plate/chassis 5.

Plate/chassis 5 is preferably electrically and thermally conductive such that it forms part of a Faraday cage around display panel 1 and is able to transfer heat to and from the display panel 1 and/or and backlight assembly 3.

The display panel 1 and, if required, the backlight assembly 3 (only required with light transmitting display technologies), and any sub-frame or other structural members coupling display panel 1 to backlight assembly 3 are parts of a display subassembly. For light emitting display technology the display subassembly is simply display panel 1. The display subassembly is preferably coupled to plate/chassis 5 via one or more elastic isolators 15. Isolators 15 operate to cushion the display assembly against shock and vibration. Isolators 15 are preferably thermally conductive so as to transfer heat from the display assembly. Isolators 15 are preferably applied in strips as shown; but other patterns may be used as well. In some instances a single isolator 15 may be used. Isolators 15 preferably comprise any adhesive compound, tape, or other form of polymer soft enough to provide shock and vibration absorbing properties and filled with thermally conductive compound to facilitate heat transference.

Frame 7 may comprise any material or combination of materials, and may be a single unitary piece or an assembly of pieces. In preferred embodiments it is a reinforced or filled plastic or metal frame providing structure, heat conduction, electrical continuity, and flexibility, securely fastening the glass cover 9, over the full range of environments, into an integral frame/glass assembly. It is sized and dimensioned to maintain an air gap between glass cover 9 and display panel 1 or to allow glass cover 9 and display panel 1 to make contact. Glass cover 9 is preferably coupled to frame 7 via mating beveled edges, flexible bonding material, angle clamps, or captivating grooves in the frame 7 members.

Assembly 100 is, because of the structure described herein, able to withstand severe environmental extreme conditions, including continuous operating and storage temperatures from −55 C to 100 C per MIL-STD-810, sustained 3-axis shock and vibration up to 40 g's per MIL-STD-810, humidity and salt fog typical of navy shipboard environments per MIL-STD-810, sand and dust typical of desert environments per MIL-STD-810, altitudes to 60,000 ft per MIL-STD-810, fungus producing climates, and is able to meet stringent conducted and radiated EMI/EMC per MIL-STD-461, MIL-STD-462, and tempest requirements, all of which are typical for the intended applications.

In preferred embodiments glass cover 9 will comprise multiple layers including anti-reflection layers, indium tin oxide (ITO) layers, index matching layers, and other layers as described in the co-pending patent application. titled "Optical Compensation of Cover Glass-Air Gap-Display Stack for High Ambient Lighting" incorporated by reference herein.

Covers 11 and 13 are preferably adapted to enclose and shield circuit boards 17 and 19. Connector 23 provides means by which electrical signals can be transmitted to and from circuit boards 17, 19, backlight assembly 3, and display panel 1 while maintaining conducted and radiated electromagnetic shielding throughout.

Figure 3:
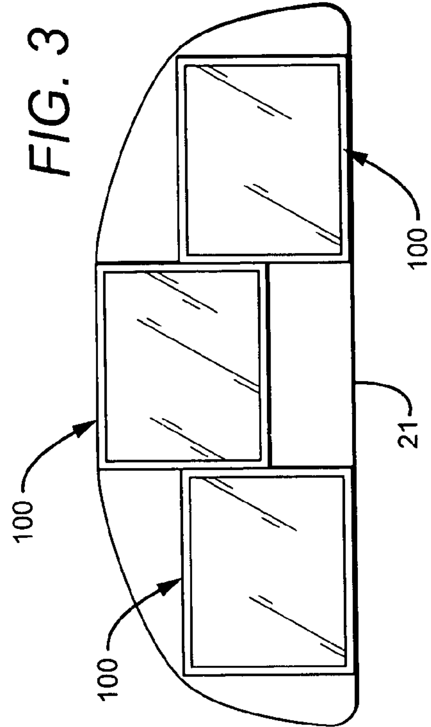
FIG. 3 is a schematic view of a typical aircraft cockpit application comprising three of the display assemblies of FIG. 1.

In aircraft, vehicle, shipboard or other installations, assembly 100 is preferably mounted to user bulkhead 21 via frame 7 and plate/chassis 5. As shown in FIG. 3, assembly 100 may be one of a plurality of display assemblies used in an aircraft, ship, ground vehicle, or other severe environment installation. It is preferred that the display apparatus described herein, using flat COTS displays technologies reliably withstand severe environmental conditions. Such conditions may relate to, among others, operating temperature, storage temperature, temperature shock, humidity, shock, vibration, sand and dust, salt fog, electromagnetic interference, blowing rain, operating pressure, pressure changes, fungus growth, and TEMPEST.

As previously mentioned, at is contemplated that the display apparatus described herein may be formed using commercial off the shelf (COTS) display panels. As such, a method of forming a display apparatus as described herein may comprise: obtaining COTS flat form and/or panel display; placing the display in a sub-frame, and, for light transmitting technologies, using the frame to couple the display to a diffuser and backlight assembly; coupling the framed display to a plate/chassis via one or more elastic isolators; enclosing the framed display in a fully conductive outer housing made up an metal rear plate/chassis and conductively coated cover glass and conductively coated or metal bezel; and coupling control circuits as to the plate/chassis and enclosing them via one or more conductively coated or metal covers. Such a display apparatus might be installed in a particular application by coupling the rear plate/chassis to any bulkhead or panel in the aircraft, ship, ground vehicle, or other installation.

Alternatively, display apparatus as described herein may be formed by any flat form and/or panel displays and any combination of the components and subassemblies described in this application.

Installation of display apparatus as described herein may comprise racks, panels, pedestals, bulkheads, or other structures used to support displays in severe environment applications.

Although not limited to any particular application, it is contemplated that display apparatus as described herein are particularly well suited for military and other severe indoor and outdoor environments where commercial off the shelf flat form and/or panel display technologies will not completely meet, operate correctly, and/or survive the more stringent application requirements.

The embodiments of the present invention described herein comprise multiple novel features with each described embodiment including either a single such feature or a combination of such features. Other contemplated embodiments include all combinations of one or more such novel features not explicitly described herein as such combinations are readily discernable from the embodiments described. In light of the various contemplated embodiments, embodiments of the present invention can be characterized in a number of ways with the following paragraphs providing examples of some such characterizations:

In some instances, an embodiment of the present invention may be characterized as a modular display assembly comprising a light emitting or transmitting display subassembly and a glass panel wherein: the display subassembly comprises a light emitting display or a combination of a transmitting display and a backlight; the display subassembly and glass panel are separated from or held in contact with each other by a frame assembly; and the display subassembly is coupled to the frame assembly by at least one elastic isolator. In some instances, such embodiments may also be characterized as having the elastic isolator have a thermal conductivity, thickness, and cross sectional area in contact with the frame assembly sufficient to conduct any heat generated by the display to the frame assembly such that the display stays within operational temperature limits during normal operation. In some instances, such embodiments may also be characterized as satisfying one or more of the following: (a) the display is a commercial off the shelf flat form and/or panel display; (b) the glass panel and frame are coupled together via mating beveled edges, flexible bonding material, angle clamps, or captivating grooves; (c) the frame assembly comprises a plate/chassis and a frame, and the display is coupled to the frame via the plate, and the frame is coupled to the glass panel; (d) the plate, frame and glass panel form are all conductive and form a Faraday cage around the display; (e) the display is positioned relative to the glass panel by the frame; (f) the display subassembly is fastened to the plate via the at least one plastic isolator; (g) the display subassembly is fastened to the frame via the at least one plastic isolator; (h) one or more circuit boards comprising control circuits for the display are coupled to the plate/chassis on a side opposite the display subassembly; (i) the assembly has a thickness of 1 inch; (j) the assembly has a packaging density of 0.02 lbs per cubic inch; and (k) the assembly is able to withstand continuous operating and storage temperatures from −55 C to 100 C per MIL-STD-810 and sustained 3-axis shock and vibration up to 40 g's per MIL-STD-810.

In some instances an embodiment of the present invention may be characterized as a modular display assembly comprising a light emitting or transmitting display subassembly and a glass panel formed by: obtaining COTS flat form and/or panel display; placing the display in a sub-frame, and, for light transmitting technologies, using the sub-frame to couple the display to a diffuser and backlight assembly; coupling the framed display to a plate/chassis via one or more elastic isolators; enclosing the framed display in a fully conductive outer housing comprising a metal rear plate/chassis, conductively coated cover glass, and a conductively coated or metal frame/bezel; and coupling control circuits as to the plate/chassis and enclosing them via one or more conductively coated or metal covers. In some instances, they may also be characterized as being able to withstand continuous operating and storage temperatures from −55 C to 100 C per MIL-STD-810 and sustained 3-axis shock and vibration up to 40 g's per MIL-STD-810.

In some instances an embodiment of the present invention may be characterized as a method of forming a modular display comprising a light emitting or transmitting display subassembly and a glass panel, the method comprising: obtaining COTS flat form and/or panel display; placing the display in a sub-frame, and, for light transmitting technologies, using the sub-frame to couple the display to a diffuser and backlight assembly; coupling the framed display to a plate/chassis via one or more elastic isolators; enclosing the framed display in a fully conductive outer housing comprising a metal rear plate/chassis, conductively coated cover glass, and a conductively coated or metal frame/bezel; and coupling control circuits as to the plate/chassis and enclosing them via one or more conductively coated or metal covers. In some instances it may also be characterized as satisfying one or more of the following: the framed display is coupled to a plate/chassis via one or more elastic isolators comprises selecting and arranging the one or more isolators to have a thermal conductivity, thickness, and cross sectional area in contact with the framed display sufficient to conduct any heat generated by the display to the rear plate/chassis such that the display stays within operational temperature limits; the display is mounted in a vehicle; the display, when coupled to the vehicle, is able to withstand continuous operating and storage temperatures from −55 C to 100 C per MIL-STD-810 and sustained 3-axis shock and vibration up to 40 g's per MIL-STD-810.

It is contemplated that the methods and apparatus described herein are particularly well suited for use in combination with the methods and apparatus of co-pending application 10/877329, having the same inventors as and filed on or about the same date as the present application, titled "Optical Compensation of Cover Glass-Air Gap-Display Stack for High Ambient Lighting", herein incorporated by reference in its entirety.

What is claimed is:

1. A modular display assembly for enclosing a light emitting or transmitting display subassembly, comprising:

a solid base plate formed out of an electrically and thermally conductive material;

a frame formed out of a material providing impact resistance and thermal and electrical conductivity fixedly attached to the base plate around the periphery, forming a cavity, the frame having an opening;

a glass panel fixedly attached to the frame at the opening for enclosing the cavity; and an elastic isolator having thermal conductivity fastening the display subassembly to the solid base plate.

2. The assembly of claim 1 wherein the elastic isolator has a thermal conductivity, thickness, and cross-sectional area in contact with the frame and base plate, sufficient to conduct heat generated by the display subassembly to the base plate so that the display stays within operational temperature limits.

3. The assembly of claim 2 wherein the display subassembly is a commercial off the shelf flat display.

4. The assembly of claim 3 wherein the glass panel and frame are attached via mating beveled edges, flexible bonding material, angle clamps, or captivating grooves.

5. The display assembly of claim 4 wherein the plate, frame and glass panel are all electrically conductive and form a Faraday cage around the display subassembly.

6. The assembly of claim 5 wherein the display subassembly is positioned relative to the glass panel in the frame.

7. The display assembly of claim 5 wherein the display subassembly is fastened to frame via the at least one plastic isolator.

8. The display assembly of claim 5 wherein one or more circuit boards comprising control circuits for the display assembly are coupled to the base plate on a side opposite the side to which the display subassembly is attached.

9. The display assembly of claim 2 wherein the display subassembly is able to withstand continuous operating and storage temperatures from −55 C to 100 C per MIL-STD-810 and sustained 3-axis shock and vibration up to 40 g's per MIL-STD-810.

* * * * *